US 6,744,609 B2

(12) United States Patent
Hiwatari et al.

(10) Patent No.: US 6,744,609 B2
(45) Date of Patent: Jun. 1, 2004

(54) MOTOR CONTROL CIRCUIT HAVING MOTOR PROTECTIVE CIRCUIT

(75) Inventors: Minoru Hiwatari, Miyagi-ken (JP); Masaaki Tanaka, Miyagi-ken (JP); Hiroaki Nakaya, Miyagi-ken (JP); Shuichi Nagaoka, Miyagi-ken (JP); Isao Takagi, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 386 days.

(21) Appl. No.: 09/790,396

(22) Filed: Feb. 21, 2001

(65) Prior Publication Data

US 2001/0019470 A1 Sep. 6, 2001

(30) Foreign Application Priority Data

Feb. 25, 2000 (JP) ........................................ 2000-050003

(51) Int. Cl.[7] ................................................ H02H 5/04
(52) U.S. Cl. .......................................... 361/24; 361/33
(58) Field of Search .............................. 361/23, 24, 28, 361/29, 30, 31, 33, 93.1, 93.7, 93.8, 93.9, 57, 103, 106

(56) References Cited

U.S. PATENT DOCUMENTS

| 4,272,708 A | | 6/1981 | Carle et al. | |
|---|---|---|---|---|
| 4,984,123 A | * | 1/1991 | James | 361/26 |
| 5,596,253 A | * | 1/1997 | Mizuta et al. | 318/469 |
| 5,898,557 A | * | 4/1999 | Baba et al. | 361/103 |

FOREIGN PATENT DOCUMENTS

JP      Hei 8-223950      8/1996

* cited by examiner

Primary Examiner—Ronald W. Leja
(74) Attorney, Agent, or Firm—Brinks Hofer Gilson & Lione

(57) ABSTRACT

When an operation switch of a motor control circuit is switched on or when the operation switch and an automatic operation switch are simultaneously switched on, a switching device is switched on to energize a relay winding and a contact in the relay is switched to drive a motor. When an overcurrent is passed to a current detecting resistor and a temperature rise in the current detecting resistor is detected by the temperature dependent resistor and/or when a rise in a voltage across terminals of the current detecting resistor is detected by an overvoltage detecting circuit, the switching device is switched off via the bias circuit to thereby stop the driving of the motor.

14 Claims, 3 Drawing Sheets

MOTOR CONTROL CIRCUIT HAVING MOTOR PROTECTIVE CIRCUIT

BACKGROUND OF THE INVENTION

1. Field of the Invention

The present invention relates to a motor control circuit and, more particularly, to a motor control circuit having a motor protective circuit of a simple configuration, for detecting an overcurrent which flows to a motor due to a failure in a load and stopping the driving of the motor to thereby prevent the motor from being damaged.

2. Description of the Related Art

Conventionally, in a power window apparatus of a vehicle, a window opening/closing motor for opening/closing a window is used. When a window closing switch (window up switch) is operated, only during the operation, the window opening/closing motor rotates in one direction to move a window in the closing direction via a window operating mechanism coupled to the window opening/closing motor. On the other hand, when a window opening switch (window down switch) is operated, only during the operation, the window opening/closing motor rotates in the other direction to move the window in the opening direction via the window operating mechanism. In the case of operating both the window closing switch and an automatic window closing switch (automatic window up switch), even when the operation of the window closing switch and the automatic window closing switch is stopped, the window opening/closing motor continuously rotates in one direction to move the window to the full close position. Similarly, in the case of operating both the window opening switch and an automatic window opening switch (automatic window down switch), even when the operation of the window opening switch and the automatic window opening switch is stopped, the window opening/closing motor continuously rotates in the other direction to move the window to the full open position.

In the power window apparatus having such a configuration, when the load of the window opening/closing motor becomes extremely heavy due to a failure in a window operating mechanism or window itself and an overcurrent is passed to the window opening/closing motor, there is a fear such that the window opening/closing motor is burnt and smoking or firing occurs. In the motor control circuit for the window opening/closing motor, a motor protective circuit is assembled. When an overcurrent is passed to the window opening/closing motor, the motor protective circuit is operated to stop the driving of the window opening/closing motor.

In an existing motor control circuit for use in a power window apparatus, as a motor protective circuit, a current detecting resistor, a custom integrated circuit (ASIC) for motor control, and a comparator which are connected in series to the window opening/closing motor are used. The motor protective circuit takes the drive current of the window opening/closing motor passed to the current detecting resistor from both ends of the current detecting resistor as a voltage and comparing the taken voltage with a reference voltage by the comparator. When a comparison voltage outputted from the comparator becomes equal to or larger than a predetermined value, the driving current of the window opening/closing motor is controlled by the comparison voltage so as not to be equal to or larger than a predetermined value, thereby preventing the window opening/closing motor from being burnt.

The existing motor control circuit for use in the power window apparatus has the motor protective circuit for controlling the driving current of the window opening/closing motor so as not to be equal to or larger than a predetermined value, thereby preventing the window opening/closing motor from being burnt. As the components of the motor protective circuit, however, relatively expensive parts such as the custom integrated circuit (ASIC) for motor control and the comparator are used, so that the manufacturing cost of the motor protective circuit is high. Since the number of parts constructing the motor protective circuit is relatively large, at the time of manufacturing the motor control circuit, the number of assembling steps is large and the assembling procedure is complicated.

SUMMARY OF THE INVENTION

The invention has been achieved in consideration of such a technical background and its object is to provide a motor control circuit having a motor protective circuit of a simple configuration constructed by using the small number of cheap parts.

In order to achieve the object, according to the invention, there is provided a motor control circuit comprising: a motor coupled to a load; a current detecting resistor connected to the motor in series; a series circuit of an operation switch, a switching device, and a relay winding connected between a power source and a reference potential point; a bias circuit including a temperature dependent resistor for supplying a bias voltage to the switching device; a switching state self-holding circuit including an automatic operation switch; and an overvoltage detecting circuit, wherein when the operation switch is switched on or when the operation switch and the automatic operation switch are simultaneously switched on, the switching device is switched on to energize the relay winding, a contact of the relay is switched, and the motor is driven, and when an overcurrent is passed to the current detecting resistor and a temperature rise in the current detecting resistor is detected by the temperature dependent resistor and/or when a rise in a voltage across terminals of the current detecting resistor is detected by the overvoltage detecting circuit at the time of driving the motor, the switching device is switched off via the bias circuit to thereby stop the driving of the motor.

With such a configuration, the motor protective circuit for immediately stopping the driving of the motor when an overcurrent is passed to the motor in both the manual operation performed by the operation switch and the automatic operation performed by both the operation switch and the automatic operation switch is constructed by the current detecting resistor, temperature dependent resistor, switching device, and relay. Consequently, the number of component parts is smaller as compared with that of an existing motor protective circuit of this type and cheap parts can be used as the component parts. As a result, the configuration is simpler and the manufacturing cost is lower as compared with the existing motor control circuit.

In the motor control circuit having the above configuration, first and second sets each comprising: a series circuit of an operation switch, a switching device, and a relay winding; a bias circuit including the temperature dependent resistor; a switching state self-holding circuit including an automatic operation switch; and an overvoltage detecting circuit may be connected in parallel to the motor and the current detecting resistor. In the first or second set, when the operation switch is turned on or the operation switch and the automatic operation switch are simultaneously turned on, the switching device is switched on to energize the relay winding, and the contact of the relay is switched to thereby drive the motor. When an overcurrent is passed to the current detecting resistor and a temperature rise in the current detecting resistor is detected by the temperature dependent resistor in the first or second set and/or when a rise in a voltage across terminals of the current detecting resistor is detected by the overvoltage detecting circuit in the same set at the time of driving the motor, the switching device in the same set is switched off via the bias circuit in the same set to thereby stop the driving of the motor.

With such a configuration, at both of the time of displacing a member to be controlled in one direction and the time of displacing the member to be controlled in the other direction, the motor protective circuit for immediately stopping the driving of the motor when an overcurrent is passed to the motor in the two operations of the manual operation performed by the operation switch and the automatic operation by the simultaneously operation of the operation switch and the automatic operation switch can be constructed by the small number of cheap component parts.

In this case, in the invention, preferably, the switching device is a transistor, a bias resistor is connected between a base and an emitter or between the base and a collector, and when the operation switch is switched on, a self bias is applied to the base via the bias resistor to turn on the transistor.

With such a configuration, a general, cheap transistor is used as the switching device. Since the transistor is turned on by turning on the operation switch to apply the self bias to the base of the transistor via the bias resistor, the configuration of the motor protective circuit is simple and the cost of the motor protective circuit is low.

Preferably, the temperature dependent resistor included in the bias supplying circuit in the invention is either a positive temperature resistive element or a negative temperature resistive element.

With such a configuration, when a change in temperature of the current detecting resistor which occurs in association with a change in the motor driving current flowing through the current detecting resistor is detected by the temperature dependent resistor, the resistance value largely changes. A change in voltage of the bias supplying circuit becomes large, and the switching device can be controlled to be on or off with high sensitivity.

Further, in the invention, a window opening/closing motor for a power window apparatus can be selected as the motor, and a window opening switch or window closing switch for the power window apparatus can be selected as the operation switch.

With such a configuration, the small, cheap motor control circuit of a power window apparatus can be achieved. Moreover, by providing the motor protective circuit, the motor can be prevented from being burnt.

DETAILED DESCRIPTION OF THE PREFERRED EMBODIMENTS

Embodiments of the invention will be described hereinbelow with reference to the drawings.

Figure 1:
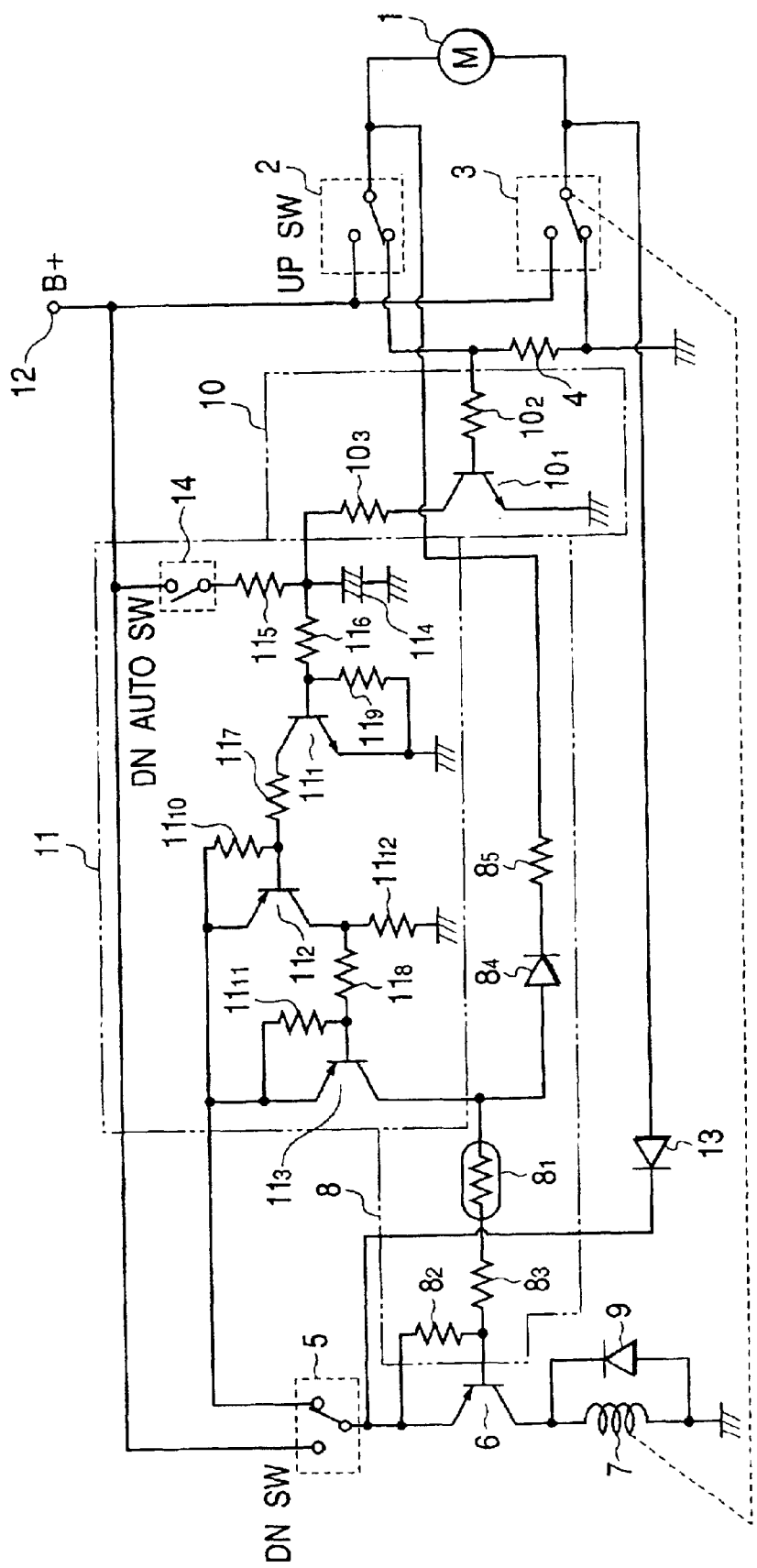
FIG. 1 is a circuit diagram showing the configuration of the main portion of a motor control circuit according to a first embodiment of the invention.

FIG. 1 is a circuit diagram showing the configuration of the main portion of a motor control circuit according to a first embodiment of the invention. The diagram shows an example where the invention is applied to a power window apparatus of a vehicle.

As shown in FIG. 1, a motor control circuit according to the first embodiment includes a motor (M) 1, a window closing switch (UP SW) 2, a relay contact 3, a current detecting resistor 4, a window opening switch (DN SW) (operation switch) 5, a switching transistor (switching device) 6, a relay winding 7, a bias circuit 8, a diode 9 for preventing spark generation, an overvoltage detecting circuit 10, a switching state self-holding circuit 11, a power supply terminal 12, and a second buffer diode 13. In this case, the bias circuit 8 includes a positive temperature resistive element (temperature dependent resistor) $8_1$, a shunt resistor $8_2$, a series resistor $8_3$, a buffer diode $8_4$, and a buffer resistor $8_5$. The overvoltage detecting circuit 10 includes an overvoltage detecting transistor $10_1$, an input resistor $10_2$, and an output resistor $10_3$. The switching state self-holding circuit 11 includes an automatic window opening switch (DN AUTO SW) (automatic operation switch) 14 and has a front-stage transistor $11_1$, an intermediate-stage transistor $11_2$, a post-stage transistor $11_3$, a voltage holding capacitor $11_4$, a buffer resistor $11_5$, series resistors $11_6$ to $11_8$, bias resistors $11_9$ to $11_{11}$, and a load resistor $11_{12}$. The relay contact 3 and the relay winding 7 are a contact and a winding of the same relay. The positive temperature resistive element $8_1$ is disposed in a position where the temperature of the current detecting resistor 4 can be sensed. A part of the configuration of the relay contact 3, current detecting resistor 4, switching transistor 6, relay winding 7, bias circuit 8, overvoltage detecting circuit 10, and switching state self-holding circuit 11 forms a motor protective circuit.

One end of the motor 1 is connected to the moving contact of the window closing switch 2, and the other end is connected to the moving contact of the relay contact 3. One of fixed contacts of the window closing switch 2 is connected to the power supply terminal 12, and the other fixed contact is connected to one end of the current detecting resistor 4. One of the fixed contacts of the relay contact 3 is connected to the power supply terminal 12 and the other fixed contact is connected to the ground point (reference potential point). The other end of the current detecting resistor 4 is connected to the ground point. In the window opening switch 5, the moving contact is connected to the emitter of the switching transistor 6, one of fixed contacts is connected to the power supply terminal 12, and the other fixed contact is connected to one of output terminals of the switching state self-holding circuit 11. The collector of the switching transistor 6 is connected to one end of the relay winding 7, the base is connected to both one end of the shunt resistor $8_2$ and one end of the series resistor $8_3$, and the emitter is connected to the other end of the shunt resistor $8_2$. One end of the relay winding 7 is connected to the cathode of the diode 9 for preventing spark generation and the other end is connected to the ground point together with the anode of the diode 9.

In the bias circuit 8, one end of the positive temperature resistive element $8_1$ is connected to the other end of the series resistor $8_3$, and the other end is connected to both the other output terminal of the switching state self-holding circuit 11 and the anode of the buffer diode $8_4$. One end of the buffer resistor $8_5$ is connected to the cathode of the buffer diode $8_4$, and the other end is connected to the moving contact of the window closing switch 2. In the overvoltage detecting circuit 10, the base of the overvoltage detecting transistor $10_1$ is connected to one end of the current detecting resistor 4 via the input resistor $10_2$, the collector is connected to the input terminal of the switching state self-holding circuit 11 via the output resistor $10_3$, and the emitter is connected to the ground point. In the switching state self-holding circuit 11, the base of the front-stage transistor $11_1$ is connected to the input terminal via the series resistor $11_6$ and is connected to the ground point via the bias resistor $11_9$, the collector is connected to the base of the intermediate-stage transistor $11_2$ via the series resistor $11_7$, and the emitter is connected to the ground point. In the base of the intermediate-stage transistor $11_2$, the base is connected to one of output terminals via the bias resistor $11_{10}$, the collector is connected to the base of the post-stage transistor $11_3$ via the series resistor $11_8$ and is connected to the ground point via the load resistor $11_{12}$, and the emitter is connected to one of the output terminals. In the post-stage transistor $11_3$, the base is connected to one of output terminals via the bias resistor $11_{11}$, the collector is connected to the other output terminal, and the emitter is connected to one of the output terminals. The moving contact of the automatic window opening switch 14 is connected to the input terminal via the buffer resistor $11_5$, and the fixed contact is connected to the power source terminal 12. One end of the voltage holding capacitor $11_4$ is connected to the input terminal and the other end is connected to the ground point. The anode of the second buffer diode 13 is connected to the moving contact of the relay contact 3, and the cathode is connected to the moving contact of the window opening switch 5.

The operation of the motor control circuit having the above configuration is as follows.

First, the case where the motor control circuit operates normally will be described.

When the window closing switch 2 is in the off state, as shown in FIG. 1, the moving contact is switched to the other fixed contact. When the window opening switch 5 is in the off state, as shown in FIG. 1, the moving contact is switched to the other fixed contact. In this state, the switching transistor 6 is in the off state, the relay winding 7 is not energized, and the relay contact 3 is also in the off state. That is, as shown in FIG. 1, the moving contact of the relay contact 3 is switched to the other fixed contact. Consequently, a ground voltage is supplied to each of both ends of the motor 1 and the motor 1 is not rotated.

When the window opening switch 5 is switched to the on state to perform a manual window opening operation, its moving contact is switched to one of the fixed contacts, and the power supply voltage (B+) of the power supply terminal 12 is supplied to the switching transistor 6 and the bias circuit 8 via the window opening switch 5. By the power supply voltage supplied to the bias circuit 8, a forward bias is applied across the base and emitter of the switching transistor 6 via the shunt resistor $8_2$ to turn on the switching transistor 6. When the switching transistor 6 is turned on, the collector current is passed to the ground point via the relay winding 7 to energize the relay winding 7, so that the relay contact 3 enters the on state, that is, the moving contact of the relay contact 3 is switched to the one of the fixed contacts. At this time, in the motor 1, the power supply voltage is applied to the other end and the ground voltage is applied to the one end. Consequently, the drive current is passed to the motor 1 via the current detecting resistor 4 to rotate the motor 1 in the other direction and to move the window in the opening direction. The movement in the opening direction of the window is continued during the window opening switch 5 is switched to the on state.

On the other hand, to perform a manual window closing operation, when the window opening switch 5 is in the off state and the window closing switch 2 is switched on, the moving contact of the window closing switch 2 is switched to the one of the fixed contacts. At this time, the power supply voltage is applied to one end of the motor 1 and the ground voltage is applied to the other end of the motor 1, so that the drive current of the polarity opposite to that in the above case is passed to the motor 1 to rotate the motor 1 in one direction and to move the window in the closing direction. The movement in the closing direction of the window is continued during the window closing switch 2 is switched to the on state.

Subsequently, in order to perform an automatic window opening operation, immediately after the window opening switch 5 is switched to the on state, the automatic window opening switch 14 is switched to the on state. A power supply voltage is supplied to the input terminal of the switching state self-holding circuit 11 via the automatic window opening switch 14 and is held as a self-holding voltage in the voltage holding capacitor $11_4$. The power supply voltage stored in the voltage holding capacitor $11_4$ turns on both the front-stage transistor $11_1$ and the intermediate-stage transistor $11_2$ at the next stage, and turns off the post-stage transistor $11_3$ following the intermediate-stage transistor $11_2$. At this time, both of the output terminals of the switching state self-holding circuit 11 are opened.

When the window opening switch 5 and the automatic window opening switch 14 are simultaneously switched on and then switched off, the moving contact of the window opening switch 5 is switched to the other fixed contact, and the input terminal of the switching state self-holding circuit 11 is disconnected from the power supply voltage. At this time, the self-holding voltage is held at the input terminal of the switching state self-holding circuit 11, and both of the output terminals of the switching state self-holding circuit 11 are maintained in the open state. The moving contact of the window opening switch 5 is connected to the moving contact of the relay contact 3 via the second buffer diode 13. Consequently, in a manner similar to the case where the moving contact is switched to one of the fixed contacts, a bias by the self-holding voltage is applied to the bias circuit 8 so as to maintain the switching transistor 6 in the on state like the state before the window opening switch 5 is switched to the off state. The motor 1 is therefore continuously rotated in the other direction to move the window in the opening direction. When the window reaches the full open position, a lock current flows to the motor 1, the voltage across the current detecting resistor 4 rises, the switching transistor $10_1$ is turned on and the self-holding voltage decreases. The switching transistors $11_1$ and $11_2$ are turned off, and the switching transistor $11_5$ is turned on, thereby connecting the other fixed contact of the window opening switch 5 and the connection point between the positive temperature resistive element $8_1$ and the diode $8_4$. It makes the voltage across the base and emitter of the switching transistor 6 decrease to turn off the switching transistor 6. The voltage supply to the relay winding 7 is stopped, and the relay contact 3 is switched to the other fixed contact. Consequently, the movement in the opening direction of the window by the automatic operation is automatically stopped.

The time in which the automatic window opening operation can be executed is within a predetermined time since the automatic window opening switch 14 is switched off until the storage voltage of the voltage holding capacitor $11_4$ decreases to a predetermined value or less. Usually, the window can be moved to the full open position within the predetermined time.

A case where the load of the motor control circuit becomes faulty and the operation of the motor control circuit becomes abnormal will now be described.

First, in the manual window opening operation, the window opening switch 5 is switched on, the switching transistor 6 enters the on state, the moving contact of the relay contact 3 is switched to one of the fixed contacts by the energization of the relay winding 7, and the motor 1 is rotating in the other direction. In such a state, when a failure occurs in a window moving mechanism coupling the motor 1 and a window or a window itself, there is a case such that an overcurrent is passed to the motor 1. At this time, an overcurrent of the same magnitude as that of the overcurrent passed to the motor 1 is passed to the current detecting resistor 4, and the temperature of the current detecting resistor 4 rises. When the temperature of the current detecting resistor 4 increases, it is transmitted to the positive temperature resistive element $8_1$ for sensing temperature rise in the current detecting resistor 4, the temperature of the positive temperature resistive element $8_1$ is increased, and the resistance value of the positive temperature resistive element $8_1$ is sharply increased. When the resistance value of the positive temperature resistive element $8_1$ increases sharply, the voltage at the contact point between the shunt resistor $8_2$ and the series resistor $8_3$ in the bias circuit 8, that is, the base bias of the switching transistor 6 is sharply increased in the positive direction. Consequently, the switching transistor 6 is immediately turned off.

The energization of the relay winding 7 is therefore stopped, and the moving contact of the relay contact 3 is switched to the other fixed contact, thereby promptly stopping the passage of the overcurrent to the motor 1. Thus, the motor 1 can be prevented from being burnt by the overcurrent.

In this case, after the failure in the window moving mechanism or window itself is repaired, by switching on the window opening switch 5, the window can be moved again in the opening direction in a normal state.

In the automatic window opening operation, that is, in the state where the automatic window opening operation is being executed after the following operation in which the moving contact of the window opening switch 5 is switched to one of the fixed contacts and then to the other fixed contact and the automatic window opening switch 14 is switched on and then is switched off, when a failure occurs in the window moving mechanism coupling the motor 1 and a window or a window itself, there is a case such that an overcurrent is passed to the motor 1 in a manner similar to the case of the manual operation.

At this time, when an overcurrent of the same magnitude as that of the overcurrent passed to the motor 1 is passed to the current detecting resistor 4, a voltage across the terminals of the current detecting resistor 4 sharply rises. In the voltage detecting circuit 10, the sharply increased voltage across the terminals is received by the base and emitter of the transistor $10_1$, a forward bias is applied, and the off state until then is switched to the on state. When the transistor $10_1$ for voltage detection enters the on state, the voltage at the input terminal of the switching state self-holding circuit 11 is sharply dropped from the self-holding voltage (power supply voltage) until then to a voltage close to the ground voltage. In the switching state self-holding circuit 11, by the sharp drop from the self holding voltage at the input terminal to the voltage close to the ground voltage, the post-stage transistor $11_3$ is turned on, and the voltage at one of the output terminals becomes equal to that at the other output terminal. Consequently, the voltage applied across the base and emitter of the switching transistor 6 sharply drops to a voltage close to the ground voltage, thereby immediately turning off the switching transistor 6.

The energization of the relay winding 7 is therefore stopped and the moving contact of the relay contact 3 is switched to the other fixed contact, so that the passage of the overcurrent to the motor 1 is promptly stopped and the motor 1 can be prevented from being burnt by the overcurrent.

In this case as well, after the failure in the window moving mechanism or window itself is repaired, by switching the moving contact of the window opening switch 5 to one of the fixed contacts and, simultaneously, switching on the automatic window opening switch 14, the normal automatic window opening operation is performed again and the window can be continuously moved in the opening direction.

Figure 2:
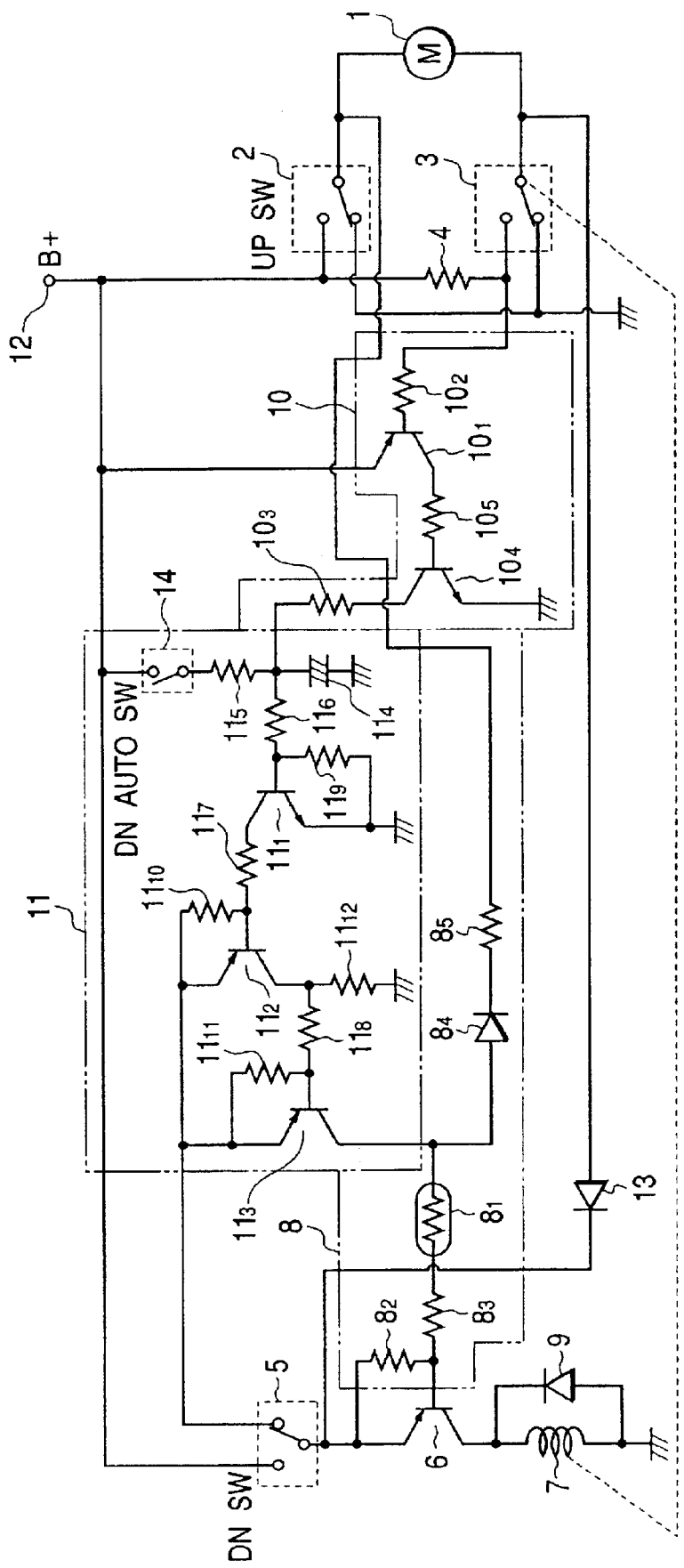
FIG. 2 is a circuit diagram showing the configuration of the main portion of a motor control circuit according to a second embodiment of the invention.

FIG. 2 is a circuit diagram showing the construction of the main portion of a motor control circuit according to a second embodiment of the invention, and shows an example where the circuit is applied to a power window apparatus of a vehicle.

In the second embodiment, the connection portion of the current detecting resistor 4 and the configuration of the voltage detecting circuit 10 are changed.

As shown in FIG. 2, the motor control circuit of the second embodiment is different from the motor control circuit of the first embodiment with respect to the connecting portion of the current detecting resistor 4 and the configuration of the voltage detecting circuit 10. The other configuration is the same as that of the motor control circuit of the first embodiment. Specifically, in the motor control circuit of the second embodiment, as the connection portion of the current detecting resistor 4, one end is connected to both one of the fixed contacts of the window closing switch 2 and the power supply terminal 12, and the other end is connected to both one of the fixed contacts of the relay contact 3 and the input terminal of the voltage detecting circuit 10. With respect to the configuration of the voltage detecting circuit 10, an output transistor $10_4$ and a coupling resistor $10_5$ are additionally disposed. An NPN type transistor is used as the transistor $11_1$ for voltage detection, the base of the transistor $11_1$ is connected to the input terminal via the input resistor $10_2$, the emitter is directly connected to the power supply terminal 12, and the collector is connected to the base of the output transistor $10_4$ via the coupling resistor $10_5$. The emitter of the output transistor $10_4$ is connected to the ground point and the collector is connected to the output terminal via the output resistor $10_3$.

The operation of the motor control circuit according to the second embodiment with the above configuration is as follows.

First, in the case where the motor control circuit normally operates, the manual window opening operation, the manual window closing operation, and the automatic window opening operation are the same as the respective operations in the motor control circuit according to the first embodiment already described. Therefore, description of the normal operations of the motor control circuit in the second embodiment will not be repeated here.

Next, the operation of the motor protective circuit which becomes abnormal during the manual window opening operation in the case where the load of the motor control circuit becomes faulty and the operation of the motor control circuit becomes abnormal is the same as that of the motor protective circuit which becomes abnormal in the manual window opening operation in the motor control circuit in the first embodiment already described above. Consequently, the operation of the motor protective circuit which becomes abnormal during the manual window opening operation in the motor control circuit according to the second embodiment will not be repeated in a fashion similar to the above.

On the other hand, the operation of the motor protective circuit which becomes abnormal during the automatic window opening operation is performed as follows.

The moving contact of the window opening switch 5 is switched to the one of the fixed contacts and then switched to the other fixed contact, and the automatic window opening automatic switch 14 is switched on and then switched off, thereby executing the automatic window opening operation. When a failure occurs in the window moving mechanism coupling the motor 1 and a window or the window itself in the state where the automatic window opening operation is executed by the above operations, there is a case such that an overcurrent is passed to the motor 1 in a manner similar to the case of the manual operation.

When an overcurrent of the same magnitude as that of the overcurrent to the motor 1 is passed to the current detecting resistor 4, the voltage across the terminals of the current detecting resistor 4 sharply increases. In the voltage detecting circuit 10, the sharply increased voltage across the terminals is received across the base and emitter of the transistor $10_1$ for voltage detection, a forward bias is applied, and the off state until then is switched to the on state. When the transistor $10_1$ for voltage detection is switched on, the output transistor $10_4$ is also turned on, and the voltage at the input terminal of the switching state self-holding circuit 11 sharply drops from the self-holding voltage (power supply voltage) until then to a voltage close to the ground voltage. In the switching state self-holding circuit 11, due to the sharp drop of the self-holding voltage at the input terminal to a voltage close to the ground voltage, the post-stage transistor $11_3$ is turned on and the voltage at one of the output terminals becomes equal to the voltage at the other output terminal. Consequently, the voltage supplied across the base and emitter of the switching transistor 6 sharply drops to a voltage close to the ground voltage to thereby immediately turn off the switching transistor 6.

The energization of the relay winding 7 is stopped and the moving contact of the relay contact 3 is switched to the other fixed contact, the passage of the overcurrent to the motor 1 is promptly stopped, and the motor 1 is therefore prevented from being burnt by the overcurrent.

In this case as well, after the failure in the window moving mechanism or window itself is repaired, the moving contact of the window opening switch 5 is switched to one of the fixed contacts and, simultaneously, the automatic window opening switch 14 is switched on, the automatic normal window opening operation is performed again and the window can be continuously moved in the opening direction.

Figure 3:
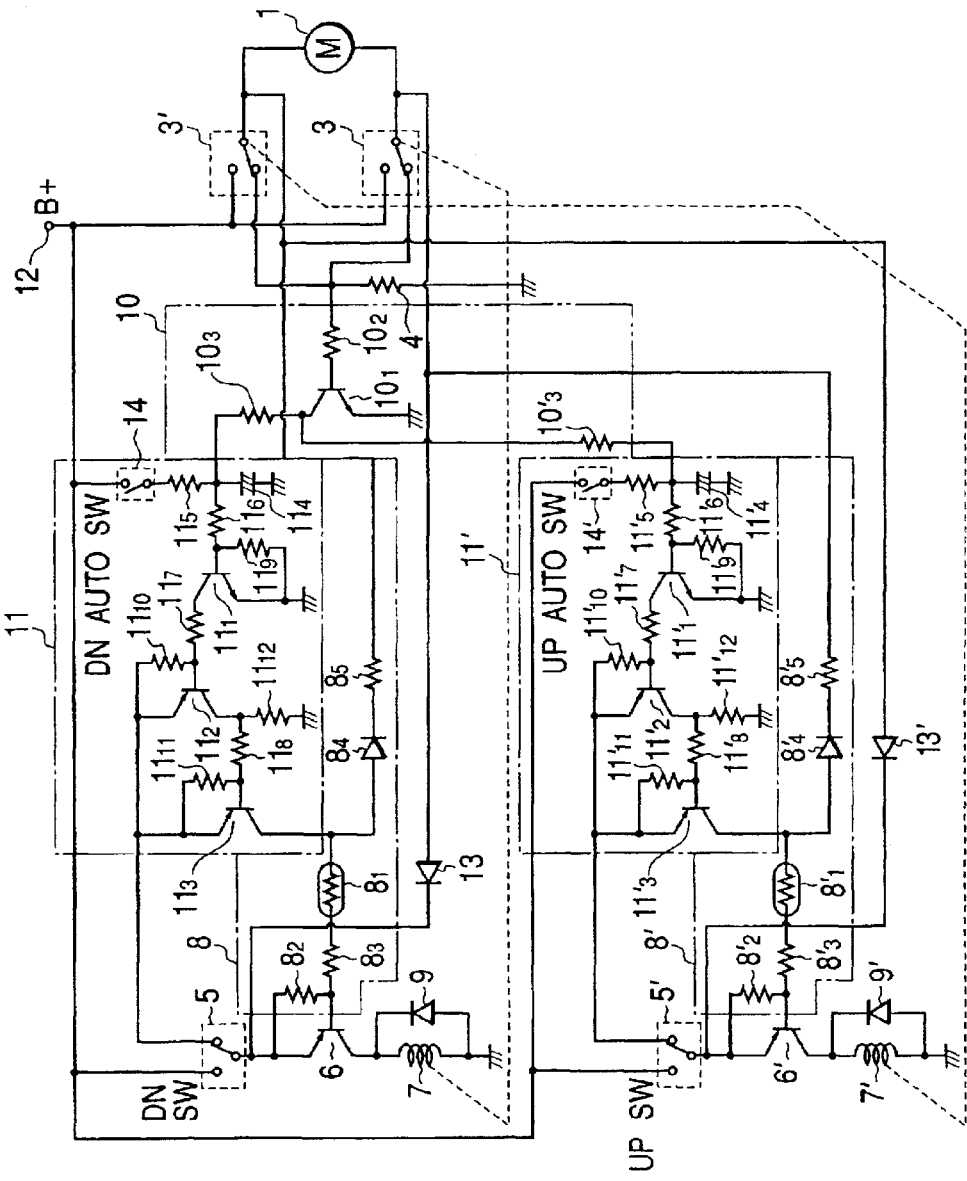
FIG. 3 is a circuit diagram showing the configuration of the main portion of a motor control circuit according to a third embodiment of the invention.

FIG. 3 is a circuit diagram showing the construction of the main portion of a motor control circuit according to a third embodiment of the invention, and shows an example where the circuit is applied to a power window apparatus of a vehicle.

In the third embodiment, in any of the manual window opening operation, manual window closing operation, automatic window opening operation, and automatic window closing operation, when an overcurrent is passed to the motor 1, the motor protective circuit is operated.

As shown in FIG. 3, the motor control circuit according to the third embodiment has, in addition to the components of the motor control circuit according to the first embodiment, a relay contact 3', a window closing switch (UP SW) 5' (operation switch), a switching transistor 6', a relay winding 7', a bias circuit 8', a diode 9' for preventing spark generation, a switching state self-holding circuit 11', and a second buffer diode 13'. In this case, the bias circuit 8' includes a positive temperature resistive element (temperature dependent resistor) $8_1$', a shunt resistor $8_2$', a series resistor $8_3$', a buffer diode $8_4$', and a buffer resistor $8_5$'. The switching state self-holding circuit 11' includes an automatic window closing switch (DN AUTO SW) 14' and has a front-stage transistor $11_1$', an intermediate-stage transistor $11_2$', a post-stage transistor $11_3$', a voltage holding capacitor $11_4$', a buffer resistor $11_5$', series resistors $11_6$' to $11_8$', bias resistors $11_9$' to $11_{11}$', and a load resistor $11_{12}$'. The overvoltage detecting circuit 10 includes not only the overvoltage detecting transistor $10_1$, the input resistor $10_2$, and the output resistor $10_3$ but also a second output resistor $10_3$'. The relay contact 3' and the relay winding 7' are a contact and a winding of the same relay. The positive temperature resistive element $8_1$' is disposed in a position where the temperature of the current detecting resistor 4 can be sensed. A part of the configuration of the relay contact 3', current detecting resistor 4, switching transistor 6', relay winding 7', bias circuit 8', overvoltage detecting circuit 10, and switching state self-holding circuit 11' forms a motor protective circuit together with a part of the relay contact 3, current detecting resistor 4, switching transistor 6, relay winding 7, bias circuit 8, overvoltage detecting circuit 10, and switching state self-holding circuit 11.

One end of the motor 1 is connected to the moving contact of the relay contact 3', and the other end is connected to the moving contact of the relay contact 3. One of fixed contacts of the relay contact 3' is connected to the power supply terminal 12, and the other fixed contact is connected to one end of the current detecting resistor 4. In the window closing switch 5', the moving contact is connected to the emitter of the switching transistor 6', one of fixed contacts is connected to the power supply terminal 12, and the other fixed contact is connected to one of output terminals of the switching state self-holding circuit 11'. The collector of the switching transistor 6' is connected to one end of the relay winding 7', the base is connected to both one end of the shunt resistor $8_2$' and one end of the series resistor $8_3$', and the emitter is connected to the other end of the shunt resistor $8_2$'. One end of the relay winding 7' is connected to the cathode of the diode 9' for preventing spark generation and the other end is connected to the ground point with the anode of the diode 9'.

In the bias circuit 8', one end of the positive temperature resistive element $8_1$' is connected to the other end of the series resistor $8_3$', and the other end is connected to both the other output terminal of the switching state self-holding circuit 11' and the anode of the buffer diode $8_4$'. One end of the buffer resistor $8_5$' is connected to the cathode of the buffer diode $8_4$', and the other end is connected to the moving contact of the relay contact 3. In the overvoltage detecting circuit 10', one end of the second output resistor $10_3$' is connected to the collector of the overvoltage detecting transistor $10_1$ and the other end is connected to the input terminal of the switching state self-holding circuit 11'. In the switching state self-holding circuit 11', the base of the front-stage transistor $11_1'$ is connected to the input terminal via the series resistor $11_6'$ and is connected to the ground point via the bias resistor $11_9'$, the collector is connected to the base of the intermediate-stage transistor $11_2'$ via the series resistor $11_7'$, and the emitter is connected to the ground point. The base of the intermediate-stage transistor $11_2'$ is connected to one of output terminals via the bias resistor $11_{10}'$, the collector is connected to the base of the post-stage transistor $11_3'$ via the series resistor $11_8'$ and is connected to the ground point via the load resistor $11_{12}'$, and the emitter is connected to one of the output terminals. In the post-stage transistor $11_3'$, the base is connected to one of output terminals via the bias resistor $11_{11}'$, the collector is connected to the other output terminal, and the emitter is connected to one of the output terminals. In the automatic window closing switch 14', the moving point is connected to the input terminal of the switching state self-holding circuit 11' via the buffer resistor $11_5'$, and the fixed contact is connected to the power supply terminal 12. One end of the voltage holding capacitor $11_4'$ is connected to the input terminal and the other end is connected to the ground point. The anode of the second buffer diode 13' is connected to the moving contact of the relay contact 3, and the cathode is connected to the moving contact of the window opening switch 5'.

The operation of the motor control circuit having the above configuration is as follows.

First, the case where the motor control circuit operates normally will be described.

When the window opening switch 5 is in the off state, as shown in FIG. 3, the moving contact is switched to the other fixed contact. When the window opening switch 5 is in the off state, as shown in FIG. 3, the moving contact is switched to the other fixed contact. In this state, the switching transistors 6 and 6' are in the off state, the relay windings 7 and 7' are not energized, and the relay contacts 3 and 3' are also in the off state. That is, as shown in FIG. 3, the moving contact of each of the relay contacts 3 and 3' is switched to the other fixed contact. Consequently, a ground voltage is supplied to each of both ends of the motor 1 and the motor 1 is not rotated.

When the window opening switch 5 is switched on to perform a manual window opening operation, the moving contact is switched to one of the fixed contacts, and the power supply voltage (B+) of the power supply terminal 12 is supplied to the switching transistor 6 and the bias circuit 8 via the window opening switch 5. By the power supply voltage supplied to the bias circuit 8, a forward bias is applied across the base and emitter of the switching transistor 6 via the shunt resistor $8_2$ to turn on the switching transistor 6. When the switching transistor 6 is turned on, the collector current is passed to the ground point via the relay winding 7 to energize the relay winding 7 and to make the relay contact 3 enter the on state, that is, the moving contact is switched to one of the fixed contacts. At this time, in the motor 1, the power supply voltage is applied to the other end and the ground voltage is applied to the one end. Consequently, the drive current is passed to the motor 1 via the current detecting resistor 4 to rotate the motor 1 in the other direction and to move the window in the opening direction. The movement in the opening direction of the window is continuously made during the window opening switch 5 is in the on state.

On the other hand, to manually perform a window closing operation, when the window opening switch 5 is in the off state, the window closing switch 5' is switched to the on state. The moving contact is switched to one of the fixed contacts and the power source voltage (B+) of the power supply terminal 12 is supplied to the switching transistor 6' and the bias circuit 8' via the window closing switch 5'. By the power supply voltage supplied to the bias circuit 8', a forward bias is applied across the base and emitter of the switching transistor 6' via the shunt resistor $8_2'$ to turn on the switching transistor 6'. When the switching transistor 6' is turned on, the collector current is passed to the relay winding 7' to energize the relay winding 7' and the moving contact of the relay contact 3' is switched to one of fixed contacts. At this time, the ground voltage is applied to the other end of the motor 1 and the power source voltage is applied to one end of the motor 1, so that the drive current is passed via the current detecting resistor 4 to the motor 1. The motor 1 is rotated in one direction to move the window in the closing direction. The movement in the closing direction of the window is continuously made during the window closing switch 5' is in the on state.

Subsequently, in order to perform an automatic window opening operation, immediately after the window opening switch 5 is switched on, the automatic window opening switch 14 is switched on. A power supply voltage is supplied to the input terminal of the switching state self-holding circuit 11 via the automatic window opening switch 14 and is held as a self-holding voltage in the voltage holding capacitor $11_4$. The power supply voltage stored in the voltage holding capacitor $11_4$ turns on the front-stage transistor $11_1$ and the intermediate-stage transistor $11_2$ at the next stage, and turns off the post-stage transistor $11_3$ following the intermediate-stage transistor $11_2$. At this time, the switching state self-holding circuit 11 makes one of the output terminals and the other output terminal open.

When the window opening switch 5 and the automatic window opening switch 14 are simultaneously switched on and then switched off, the moving contact of the window opening switch 5 is switched to the other fixed contact and the input terminal of the switching state self-holding circuit 11 is disconnected from the power supply voltage. At this time, the self-holding voltage is held at the input terminal of the switching state self-holding circuit 11, and both output terminals of the switching state self-holding circuit 11 are maintained at the open state. The moving contact of the window opening switch 5 is connected to the moving contact of the relay contact 3 via the second buffer diode 13. Consequently, in a manner similar to the case where the moving contact is switched to one of the fixed contacts, a bias by the self holding voltage is applied to the bias circuit 8 so as to maintain the switching transistor 6 in the on state like the state before the window opening switch 5 is switched to the off state. The motor 1 is therefore continuously rotated in the other direction to move the window in the opening direction. When the window reaches the full open position, a lock current flows to the motor 1, the voltage across the current detecting resistor 4 rises, the switching transistor $10_1$ is turned on, the self-holding voltage decreases, the switching transistors $11_1$ and $11_2$ are turned off, and the switching transistor $11_5$ is turned on, thereby connecting the other fixed contact of the window opening switch 5 and the connection point between the positive temperature resistive element $8_1$ and the diode $8_4$. The voltage across the base and emitter of the switching transistor 6 decreases to turn off the switching transistor 6 and stop the voltage supply to the relay winding 7, and the relay contact 3 is switched to the other fixed contact. Consequently, the movement in the opening direction of the window by the automatic operation is automatically stopped.

The time in which the automatic window opening operation can be executed is within a predetermined time since the automatic window opening switch 14 is switched off to disconnect the input terminal of the switching state self-holding circuit 11 from the power supply terminal until the storage voltage of the voltage holding capacitor $11_4$ decreases to a predetermined value or less. Usually, the window can be moved to the full open position within the predetermined time.

When the window closing switch 5' is switched to the on state and, immediately after that, the automatic window closing switch 14' is switched to the on state to perform the automatic window closing operation, the operation similar to the above-described automatic window opening operation is performed. The motor 1 is continuously rotated in one direction to keep on moving the window in the closing direction. The movement in the closing direction of the window by the automatic operation is substantially the same as that executed by the above-described automatic window opening operation and is automatically stopped when the window reaches the full closed position.

The time in which such an automatic window closing operation can be performed is within a predetermined time since the automatic window closing switch 14' is switched off to disconnect the input terminal of the switching state self-holding circuit 11' from the power supply voltage until the storage voltage in the voltage holding capacitor $11_4$' decreases to a predetermined value or less. Usually, the window can be moved to the full close position within the predetermined time.

On the other hand, the operation of the motor protective circuit which becomes abnormal during the automatic window opening operation is performed as follows.

The moving contact of the window opening switch 5 is switched to one of the fixed contacts and then to the other fixed contact, and the automatic window opening switch 14 is switched to the on state and then to the off state. During the automatic window opening operation is executed by the above operations, when a failure occurs in a window moving mechanism coupling the motor 1 and a window or a window itself, there is a case such that an overcurrent is passed to the motor 1 in a manner similar to the case of the manual operation.

At this time, when an overcurrent of the same magnitude as that of the overcurrent passed to the motor 1 is passed to the current detecting resistor 4, a voltage across the terminals of the current detecting resistor 4 sharply increases. In the overvoltage detecting circuit 10, the sharply increased voltage across the terminals is received by the base and emitter of the transistor $10_1$ for voltage detection, a forward bias is applied, and the off state until then is switched to the on state. When the transistor $10_1$ for voltage detection is switched on, the output transistor $10_4$ also enters the on state, and the voltage at the input terminal of the switching state self-holding circuit 11 sharply drops from the self holding voltage (power supply voltage) until then to a voltage close to the ground voltage. By the sharp drop from the self holding voltage to the voltage close to the ground voltage, the post-stage transistor $11_3$ is turned on, and the voltage at one of the output terminals becomes equal to that at the other output terminal. Consequently, the voltage supplied across the base and emitter of the switching transistor 6 sharply drops to a voltage close to the ground voltage and the switching transistor 6 is immediately turned off.

The energization of the relay winding 7 is therefore stopped, and the moving contact of the relay contact 3 is switched to the other fixed contact, thereby promptly stopping the passage of the overcurrent to the motor 1, so that the motor 1 can be prevented from being burnt by the overcurrent.

In this case as well, after the failure in the window moving mechanism or window itself is repaired, the moving contact of the window opening switch 5 is switched to one of the fixed contacts and, simultaneously, the automatic window opening switch 14 is switched to the on state. A normal automatic window opening operation is performed again so that the window can be continuously moved in the opening direction.

The operation of the motor protective circuit when the automatic window closing operation becomes abnormal is substantially the same as that of the motor protective circuit when the automatic window opening operation becomes abnormal. When the voltage detecting circuit 10 detects a sharp increase in the voltage across the terminals of the current detecting resistor 4, the switching state self-holding circuit 11' immediately turns off the switching transistor 6'.

The energization of the relay winding 7' is therefore stopped and the moving point of the relay contact 3' is switched to the other fixed contact, so that the passage of the overcurrent to the motor 1 can be promptly stopped and the motor 1 can be prevented from being burnt by the overcurrent.

In this case as well, after a failure in the window moving mechanism or window itself is repaired, the moving contact of the window opening switch 5' is switched to one of the fixed contacts and, simultaneously, the automatic window closing switch 14' is switched on. The normal automatic window closing operation is performed again and the window can be continuously moved in the closing direction.

Although the examples of applying the motor control circuit to the power window apparatus of a vehicle have been described in the first to third embodiments, the motor control circuit according to the invention is not limited to be applied to the power window apparatus of a vehicle but can be also similarly applied to apparatuses similar to the power window apparatus.

Although the examples in which the positive temperature resistive elements $8_1$ and $8_1$' are used as the temperature dependent resistors have been described in the foregoing first to third embodiments, the motor control circuit according to the invention is not limited to that using the positive temperature resistive element $8_1$ ($8_1$') as the temperature dependent resistor but may be a circuit using a negative temperature resistive element. In the case of using the negative temperature resistive element, it is sufficient to use an NPN type switching transistor as the switching transistor 6 (6') in place of the PNP type switching transistor, and to connect a shunt resistor between the collector and the base in place of connecting the shunt resistor $8_3$ ($8_3$') between the base and emitter.

Further, the configuration of each of the motor control circuits according to the first to third embodiments can be changed as appropriate as long as the basic circuit configuration is not changed. For example, instead of using the junction type switching transistor 6 (6') as the switching device, a transistor of another type such as FET may be used.

As described above, according to the invention, the motor protective circuit for immediately stopping the driving of the motor when an overcurrent is passed to the motor in both the manual operation performed by the operation switch and the automatic operation performed by both the operation switch and the automatic operation switch is constructed by the current detecting resistor, temperature dependent resistor, switching device, and relay. Consequently, the number of component parts is smaller as compared with that of an existing motor protective circuit of this type and cheap parts can be used as the component parts. Thus, an effect such that the configuration is simpler and the manufacturing cost is lower as compared with the existing motor control circuit is produced.

What is claimed is:

1. A motor control circuit comprising:

a motor coupled to a load;

a current detecting resistor connected to the motor;

a series circuit of an operation switch, a switching device, and a relay winding connected between a power source and a reference potential point;

a bias circuit including a temperature dependent resistor for supplying a bias voltage to the switching device;

a switching state self-holding circuit including an automatic operation switch; and an overvoltage detecting circuit, wherein the switching device is a transistor, a bias resistor is connected one of between a base and an emitter and between the base and a collector, and when the operation switch is switched on, a self bias turns on the transistor via the bias resistor, wherein one of when the operation switch is switched on and when the operation switch and the automatic operation switch are simultaneously switched on, the switching device is switched on to energize the relay winding, a contact of the relay is switched, and the motor is driven, and when an overcurrent is passed to the current detecting resistor and one of a temperature rise in the current detecting resistor is detected by the temperature dependent resistor and when a rise in a voltage across terminals of the current detecting resistor is detected by the overvoltage detecting circuit at the time of driving the motor, the switching device is switched off via the bias circuit to thereby stop the driving of the motor.

2. The motor control circuit according to claim 1, wherein first and second sets each comprising: a series circuit of an operation switch, a switching device, and a relay winding; a bias circuit including a temperature dependent resistor; a switching state self-holding circuit including an automatic operation switch; and an overvoltage detecting circuit are connected in parallel to the motor and the current detecting resistor, in one of the first and second set, when one of the operation switch is turned on and the operation switch and the automatic operation switch are simultaneously turned on, the switching device is switched on to energize the relay winding, and a contact of the relay is switched to thereby drive the motor, and when an overcurrent is passed to the current detecting resistor and one of a temperature rise in the current detecting resistor is detected by the temperature dependent resistor in one of the first and second set and when a rise in a voltage across terminals of the current detecting resistor is detected by the overvoltage detecting circuit in a same set at the time of driving the motor, the switching device in the same set is switched off via the bias circuit in the same set to thereby stop the driving of the motor.

3. The motor control circuit according to claim 2, wherein the temperature dependent resistor is one of a positive temperature resistive element and a negative temperature resistive element.

4. The motor control circuit according to claim 2, wherein the overvoltage detecting circuit includes a transistor for voltage detection and the transistor for voltage detection detects a voltage across terminals of the current detecting resistor by a base and an emitter.

5. The motor control circuit according to claim 2, wherein the motor is a window opening/closing motor for a power window apparatus, and the operation switch is one of a window opening switch and window closing switch for the power window apparatus.

6. The motor control circuit according to claim 1, wherein the motor is a window opening/closing motor for a power window apparatus, and the operation switch is one of a window opening switch and window closing switch for the power window apparatus.

7. The motor control circuit according to claim 1, wherein the overvoltage detecting circuit includes a transistor for voltage detection and the transistor for voltage detection detects a voltage across terminals of the current detecting resistor by a base and an emitter.

8. A motor control circuit comprising:

a motor coupled to a load;

a current detecting resistor connected to the motor;

a series circuit of an operation switch, a switching device, and a relay winding connected between a power source and a reference potential point;

a bias circuit including a temperature dependent resistor for supplying a bias voltage to the switching device;

a switching state self-holding circuit including an automatic operation switch; and an overvoltage detecting circuit, wherein one of when the operation switch is switched on and when the operation switch and the automatic operation switch are simultaneously switched on, the switching device is switched on to energize the relay winding, a contact of the relay is switched, and the motor is driven, when an overcurrent is passed to the current detecting resistor and one of a temperature rise in the current detecting resistor is detected by the temperature dependent resistor and when a rise in a voltage across terminals of the current detecting resistor is detected by the overvoltage detecting circuit at the time of driving the motor, the switching device is switched off via the bias circuit to thereby stop the driving of the motor, and wherein the temperature dependent resistor is one of a positive temperature resistive element and a negative temperature resistive element.

9. The motor control circuit according to claim 8, wherein first and second sets each comprising: a series circuit of an operation switch, a switching device, and a relay winding; a bias circuit including a temperature dependent resistor; a switching state self-holding circuit including an automatic operation switch; and an overvoltage detecting circuit are connected in parallel to the motor and the current detecting resistor, in one of the first and second set, when one of the operation switch is turned on and the operation switch and the automatic operation switch are simultaneously turned on, the switching device is switched on to energize the relay winding, and a contact of the relay is switched to thereby drive the motor, and when an overcurrent is passed to the current detecting resistor and one of a temperature rise in the current detecting resistor is detected by the temperature dependent resistor in one of the first and second set and when a rise in a voltage across terminals of the current detecting resistor is detected by the overvoltage detecting circuit in a same set at the time of driving the motor, the switching device in the same set is switched off via the bias circuit in the same set to thereby stop the driving of the motor.

10. The motor control circuit according to claim 8, wherein the overvoltage detecting circuit includes a transistor for voltage detection and the transistor for voltage detection detects a voltage across terminals of the current detecting resistor by a base and an emitter.

11. The motor control circuit according to claim 8, wherein the motor is a window opening/closing motor for a power window apparatus, and the operation switch is one of a window opening switch and window closing switch for the power window apparatus.

12. A motor control circuit comprising:

a motor coupled to a load;

a current detecting resistor connected to the motor;

a series circuit of an operation switch, a switching device, and a relay winding connected between a power source and a reference potential point;

a bias circuit including a temperature dependent resistor for supplying a bias voltage to the switching device;

a switching state self-holding circuit including an automatic operation switch; and an overvoltage detecting circuit, wherein one of when the operation switch is switched on and when the operation switch and the automatic operation switch are simultaneously switched on, the switching device is switched on to energize the relay winding, a contact of the relay is switched, and the motor is driven, when an overcurrent is passed to the current detecting resistor and one of a temperature rise in the current detecting resistor is detected by the temperature dependent resistor and when a rise in a voltage across terminals of the current detecting resistor is detected by the overvoltage detecting circuit at the time of driving the motor, the switching device is switched off via the bias circuit to thereby stop the driving of the motor, and wherein the overvoltage detecting circuit includes a transistor for voltage detection and the transistor for voltage detection detects a voltage across terminals of the current detecting resistor by a base and an emitter.

13. The motor control circuit according to claim 12, wherein first and second sets each comprising: a series circuit of an operation switch, a switching device, and a relay winding; a bias circuit including a temperature dependent resistor; a switching state self-holding circuit including an automatic operation switch; and an overvoltage detecting circuit are connected in parallel to the motor and the current detecting resistor, in one of the first and second set, when one of the operation switch is turned on and the operation switch and the automatic operation switch are simultaneously turned on, the switching device is switched on to energize the relay winding, and a contact of the relay is switched to thereby drive the motor, and when an overcurrent is passed to the current detecting resistor and one of a temperature rise in the current detecting resistor is detected by the temperature dependent resistor in one of the first and second set and when a rise in a voltage across terminals of the current detecting resistor is detected by the overvoltage detecting circuit in a same set at the time of driving the motor, the switching device in the same set is switched off via the bias circuit in the same set to thereby stop the driving of the motor.

14. The motor control circuit according to claim 12, wherein the motor is a window opening/closing motor for a power window apparatus, and the operation switch is one of a window opening switch and window closing switch for the power window apparatus.

* * * * *